(12) United States Patent
Young et al.

(10) Patent No.: US 8,234,068 B1
(45) Date of Patent: Jul. 31, 2012

(54) SYSTEM, MODULE, AND METHOD OF CONSTRUCTING A FLIGHT PATH USED BY AN AVIONICS SYSTEM

(75) Inventors: Shih-Yih Young, Marion, IA (US); Kristen M. Jerome, Central City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 505 days.

(21) Appl. No.: 12/321,112

(22) Filed: Jan. 15, 2009

(51) Int. Cl.
*G01C 21/00* (2006.01)

(52) U.S. Cl. ............ 701/528; 701/23; 701/24; 701/27; 701/400; 701/408; 701/410; 701/416; 701/423; 701/448; 701/301; 342/65; 244/175; 244/195

(58) Field of Classification Search .......... 701/3, 4, 701/9–11, 14, 17, 23–28, 201, 202, 205, 701/209, 210, 213, 214, 218, 219, 300, 301, 701/400, 408, 409, 410, 411, 416, 423, 448, 701/528, 533, 302; 340/945, 953, 961–967, 340/970, 974–976, 979; 342/27–32, 38, 342/46, 47, 65, 118–123, 357.2, 357.23, 342/357.25, 455, 456, 462; 244/75.1, 76 R, 244/175, 185–188, 194, 195
See application file for complete search history.

(56) References Cited

U.S. PATENT DOCUMENTS

| 6,122,572 | A  | * | 9/2000 | Yavnai | 701/23 |
| 6,182,007 | B1 | * | 1/2001 | Szczerba | 701/423 |
| 6,496,741 | B1 | * | 12/2002 | Whiffen | 700/28 |
| 6,750,815 | B2 | * | 6/2004 | Michaelson et al. | 342/357.31 |
| 6,785,610 | B2 | * | 8/2004 | Baker et al. | 701/301 |
| 7,010,398 | B2 | * | 3/2006 | Wilkins et al. | 701/3 |
| RE41,271 | E  | * | 4/2010 | Vaida | 340/963 |
| 7,710,828 | B2 | * | 5/2010 | Barger et al. | 367/127 |
| 7,937,349 | B2 | * | 5/2011 | Pucher | 706/45 |
| 7,970,532 | B2 | * | 6/2011 | Tehan et al. | 701/423 |
| 2001/0023390 | A1 | * | 9/2001 | Gia | 701/301 |
| 2006/0155432 | A1 | * | 7/2006 | Brown | 701/14 |
| 2006/0168592 | A1 | * | 7/2006 | Andrews et al. | 719/318 |
| 2008/0270331 | A1 | * | 10/2008 | Taylor et al. | 706/13 |

OTHER PUBLICATIONS

U.S. Appl. No. 11/394,403, filed Mar. 31, 2006, Young et al.
U.S. Appl. No. 12/069,319, filed Feb. 8, 2008, Wichgers.
U.S. Appl. No. 12/217,457, filed Jul. 2, 2008, Frank et al.

(Continued)

*Primary Examiner* — Hussein Elchanti
*Assistant Examiner* — Rami Khatib
(74) *Attorney, Agent, or Firm* — Donna P. Suchy; Daniel M. Barbieri

(57) ABSTRACT

A present novel and non-trivial system, module, and method for constructing a flight path used by an avionics system are disclosed. A processor receives flight plan data and object data associated with terrain and obstacles. Free cells are extracted above the objects using a recursive space decomposition technique, and a reference path is formed through traversable free space determined from the availability of free cells. In an additional embodiment, threat data associated with hostile military weaponry and significant meteorological conditions could affect the availability of free cells. A genetic algorithm applying genetic operators which include mutators is employed with aircraft kinematic constraints to refine the reference path used to form a population of best path candidates. When a best path is reached after cycling through a re-generation process of path candidates, flight path data representative of the best path is generated and provided to at least one avionics system.

33 Claims, 7 Drawing Sheets

OTHER PUBLICATIONS

U.S. Appl. No. 12/283,399, filed Sep. 8, 2008, Barber et al.

U.S. Appl. No. 12/284,561, filed Sep. 23, 2008, Barber.

Young, R., et al, "Long-Range, In-Flight 3D Trajectory Re-Planning with Airborne E*", Institute of Navigation Institute of Navigation National Technical Meeting ("ION NTM") 2008, Jan. 28-30, 2008, San Diego, CA.

Zheng, C., et al, "Evolutionary Route Planner for Unmanned Air Vehicles," IEEE Transactions on Robotics, vol. 21, No. 4, Aug. 2005.

Chen, D., et al, "Using Framed-Quadtrees to Find Conditional Shortest Paths in an Unknown 2-D Environment," Technical Report #95-2, Department of Computer Science and Engineering, University of Notre Dame, Notre Dame, Indiana, Jan. 1995.

Xu. J., et al, "A New Approach for Determining Optimal Paths in a Dynamic 2-D Environinent Using Monotone Framed-Octrees," Proceedings of 1997 IEEE International Conference on Systems, Man, and Cybernetics, Oct. 12-15, 1997.

Chen, D., et al, "Determining Conditional Shortest Paths in an Unknown, Three-Dimensional Environment Using Framed-Octree," Proceedings of the IEEE International Conference on Systems, Man, and Cybernetics, pp. 4101-4106, 1995.

Bhattacharya, Parthajit, *Efficient Neighbor Finding Algorithms in Quadtree and Octree*, Master Thesis, Indian Institute of Technology, Nov. 2001.

Stentz, A., "The Focused D* Algorithm for Real-Time Replanning," *Proceedings of the International Joint Conference on Artificial Intelligence*, Aug. 1995.

Appendices A & B of Final report for FY 2006 VMS Path Planning Enhancement IR&D project, Rockwell Collins internal document, 2006.

Zhang, R., et al, "Route Planning for Unmanned Air Vehicles with Multiple Missions Using an Evolutionary Algorithm," Proceedings of The Third International Conference on Natural Computation (ICNC 2007), Haikou, China, Aug. 24-27, 2007.

Nikolos, I., "Evolutionary Algorithm Based Offline/Online Path Planner for UAV Navigation," IEEE Transactions on Systems, Man, and Cybernetics—Part B: Cybernetics, vol. 33, No. 6, Dec. 2003.

* cited by examiner

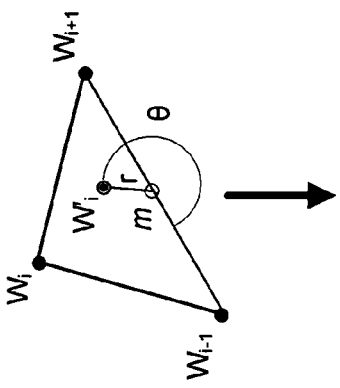

Formula 4-4
$W_i$, where
$i = \begin{cases} 1, \ldots, n-2, & \beta = \text{true} \\ 2, \ldots, n-3, & \beta = \text{false} \end{cases}$

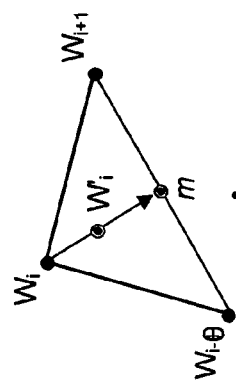

Formula 4-3
$W_i' = W_i + \gamma * \overline{\delta W}$, where
$i = \begin{cases} 1, \ldots, n-2, & \beta = \text{true} \\ 2, \ldots, n-3, & \beta = \text{false} \end{cases}$;
$\overline{\delta W} = [(W_{i+1} + W_{i-1}) / 2] - W_i$
$\gamma$ is a random real value between (0,1);

Formula 4-1
$X' = \gamma * X + (1 - \gamma) * Y$
$Y' = \gamma * Y + (1 - \gamma) * X$, where
X and Y are parent paths;
X' and Y' are offspring paths;
$\gamma$ is a random integer value between (0%, 100%)

Formula 4-2
$W_i$, where
$i = \begin{cases} 1, \ldots, n-2, & \beta = \text{true} \\ 2, \ldots, n-3, & \beta = \text{false} \end{cases}$ Formula 4-5
$x'_{n-2} = x_{n-2} + \lambda(x_{n-2} - x_{n-1})$
$y'_{n-2} = y_{n-2} + \lambda(y_{n-2} - y_{n-1})$
$z'_{n-2} = z_{n-2} + \lambda(z_{n-2} - z_{n-1})$, where
$(x'_{n-2}, y'_{n-2}, z'_{n-2})$ are the new coordinates of the (n-2)th waypoint after the operation;
$\lambda$ is a random real value between (0, 2α);
$\alpha = \ell / \ell_i$

FIG. 4

Formula 5-1

$$F(G) = \begin{cases} 1/\text{Path\_Cost}(G), & G \text{ is feasible} \\ 1/(C_{max} + NPC(G)), & G \text{ is infeasible} \end{cases}$$

Formula 5-2

$$NPC(G) = w_\varphi * NP_\varphi + \sum (w_\ell * NP_\ell(i) + w_\phi * NP_\phi(i) + w_\theta * NP_\theta(i) + w_T * NP_T(i)), \text{ where}$$

w is the weighting factor for a component of the normalized penalty cost

Formula 5-3

$$((a_i^T - a_j)/(\|a_i-1\| \|a_j\|)) \geq \cos \Phi_{max}$$

Formula 5-4

$$NP_\Phi(i) = \begin{cases} |\Phi_i|/\Phi_{max}, & |\Phi_i| > \Phi_{max} \\ 0, & |\Phi_i| \leq \Phi_{max} \end{cases}$$

Formula 5-5

$$(|z_{i+1} - z_i|/|a_i|) \leq \tan \theta_{max}$$

Formula 5-6

$$NP_\theta(i) = \begin{cases} |\theta_i|/\theta_{max}, & |\theta_i| > \theta_{max} \\ 0, & |\theta_i| \leq \theta_{max} \end{cases}$$

Formula 5-7

$$(|\varphi_G - \varphi_D|) \leq \varphi_{TD}, \text{ where}$$

$\varphi_G$ is the deviation or approach heading angle;

$\varphi_D$ is the desired deviation or approach heading angle;

$\varphi_{TD}$ is the heading angle tolerance;

Formula 5-8

$$NP_\varphi(i) = \begin{cases} |\varphi_G - \varphi_D|/\varphi_{TD}, & |\varphi_G - \varphi_D| > \varphi_{TD} \\ 0, & |\varphi_G - \varphi_D| \leq \varphi_{TD} \end{cases}$$

Formula 5-9

$$NP_T(i) = C_{max}$$

Formula 5-10

$$\ell_i \geq \ell$$

Formula 5-11

$$NP_\ell(i) = \begin{cases} \ell/\ell_i, & \ell_i < \ell \\ 0, & \ell_i \geq \ell \end{cases}$$

FIG. 5

SYSTEM, MODULE, AND METHOD OF CONSTRUCTING A FLIGHT PATH USED BY AN AVIONICS SYSTEM

BACKGROUND OF THE INVENTION

1. Field of the Invention

This invention pertains generally to the field of aviation and the construction of flight paths used by avionics equipment installed in an aircraft.

2. Description of the Related Art

A Flight Management System ("FMS") for both commercial and military aircraft usually contains an active flight plan that can be used to guide the aircraft from one location to another and to compute critical flight parameters such as BINGO (i.e., remaining flight time before returning to base without using reserve fuel). The active flight plan is usually created by an off-line route planning program or pilots and is loaded into FMSs before takeoffs. However, due to unforeseen events such as weather hazards and pop-up threats, the active flight plan may need to be modified in-flight to guide aircraft away from pop-up hazards. Most of current FMSs have the auto routing capability to automatically re-plan a new flight plan in-flight upon pilot request. However, the auto routing functions in FMSs usually re-plan a new path based only on pre-stored navigation waypoints without any consideration of terrain and pop-up hazards. The primary purpose of this auto routing function is to increase the autonomy of the flight deck.

To enhance the survivability of Unmanned Aerial Vehicles ("UAVs"), new auto routing requirements are coming from military users to enhance the current auto routing function in FMS or Mission Computer System ("MCS"). Current UAVs or manned aircraft controlling them are equipped with multiple tactical data links to receive threat information from various sources in-flight. A data correlation function is used to fuse this threat information and produce a clear and concise picture about the threat environment surrounding the aircraft. With this concise threat picture and a detailed 3D terrain database, this new real-time auto router can automatically generate a safe and flyable 3D flight plan and present it to pilots controlling UAVs for approval well ahead of pop-up threats being encountered. The approved flight plan can then be data linked to MCS in the UAV. Therefore, a real-time auto router increases the survivability of the unmanned aircraft.

Technical challenges imposed by these new real-time auto routing requirements include the following: search data in a terrain database over a large area such as a circle with a radius of one-hundred fifty (150) nautical miles ("nm") because the re-planned path can be more than 150 nm long; avoid multiple 3D threats simultaneously; re-plan a 3D path that is flyable; complete the re-planning task within seconds; and host the software in an onboard embedded platform with a constrained computational speed. In other words, the technical challenges are primarily due to the fact that a huge amount of data needs to be processed within seconds and in an embedded platform with a constrained computational speed.

Route planning has been an active research area over the past forty (40) years, especially in the robotic community; however, in the robotic community, most of real-time route planning algorithms were developed to construct a safe path with a range up to a couple of hundreds of meters—not 150 nautical miles. In UAV community, some route planning algorithms were developed to be coupled with a flight control system to serve as an integrated real-time motion planner that generates outer-loop control commands at high rates. The re-planning distance is usually limited to be within a couple of kilometers. Therefore, there is a clear need to develop an innovative real-time auto router that can meet the emerging military as well as civilian requirements.

BRIEF SUMMARY OF THE INVENTION

A system, module, and method for constructing a flight path is disclosed. The disclosures herein has been adapted from Rockwell Collins' Airborne E* planning algorithm disclosed in a published article written by Dr. Ryan S. Y. Young and Kristen M. Jerome, "Long-Range, In-Flight 3D Trajectory Re-Planning with Airborne E*" ION NTM 2008, 28-30 Jan. 2008, San Diego, Calif. ("Airborne E*"). This published article incorporated by reference in its entirety. Airborne E* was adapted from a real-time motion planner E* designed for autonomous ground vehicle applications as described Young et al in a U.S. patent application Ser. No. 11/394,403 entitled "Motion Planner for Unmanned Ground Vehicles Traversing at High Speeds in Partially Known Environments."

In one embodiment, a system is disclosed for constructing a flight path used by an avionics system. The system comprises a source of flight plan data, a source of object data where an object may be terrain and/or obstacles, a processor, and an avionics system to receive the generated flight path. After receiving the flight plan and object data, a flight path may be constructed by extracting free cells above the objects, determining traversable free space from available free cells, constructing a reference path between two points on the flight plan, refining the reference path using a genetic algorithm, and providing data representative of the refined flight path to at least one avionics system. In an additional embodiment, the genetic algorithm refines the reference path by constructing a flight path from the reference path using such reference path to generate a population of path candidates using genetic mutating functions, where each path candidate is subjected to a fitness value evaluation using aircraft kinematic constraints, and the path candidates having the best fitness values are selected for subsequent generation; in an additional embodiment, aircraft kinematic constraints may employ input factor data representative of real-time measurements. The generation cycle continues until an exit condition is met, at which time the best path candidate is selected, and flight path data representative of the best path candidate is generated. In an additional embodiment, threat data may be received, pseudo-free cells may be extracted, and pseudo-free cells determined to be full cells as a result of the threat data are eliminated from the availability of free cells. In an additional embodiment, threat data may be data representative of hostile military weaponry and significant meteorological conditions. In an additional embodiment, a crew alerting system may be employed to receive alert signals associated with the threat data.

In another embodiment, a module is disclosed for constructing a flight path used by an avionics system. The module comprises an input communications interface to facilitate the providing of data to a processor, the processor, and an output communications interface to facilitate the providing of data to at least one avionics system. After receiving the flight plan and object data via the interface, the processor may be configured to construct a flight path by extracting free cells above the objects, determine traversable free space from available free cells, construct a reference path between two points on the flight plan, refine the reference path using a genetic algorithm as discussed above, and provide data representative of the refined flight path to at least one avionics system. In an additional embodiment, threat data may be received by the processor, from which the processor may extract pseudo-free cells above the objects corresponding to the threat data, identify full cells from the pseudo-free cells using the threat data, and eliminate from the availability of free cells those cells which have been identified as full cells. In an additional embodiment, the processor may receive threat data representative of hostile military weaponry and significant meteorological conditions. In an additional embodiment, the processor may generate an alert signal based upon the threat data and provide such signal to a crew alerting system.

In another embodiment, a method is disclosed for constructing a flight path used by an avionics system. The method comprises receiving the flight plan and object data, constructing a flight path by extracting free cells above the objects, determining traversable free space from available free cells, constructing a reference path between two points on the flight plan, refining the reference path using a genetic algorithm as discussed above, and providing data representative of the refined flight path to at least one avionics system. In an additional embodiment, the process could include receiving threat data, extracting pseudo-free cells corresponding to the threat data, identifying full cells from the pseudo-free cells using the threat data, and eliminating from the availability of free cells those cells which have been identified as full cells. In an additional embodiment, the threat data could be representative of hostile military weaponry and significant meteorological conditions.

BRIEF DESCRIPTION OF THE DRAWINGS

FIG. 4 provides formulas associated with genetic operators.

FIG. 5 provides formulas associated with aircraft kinematic constraints.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
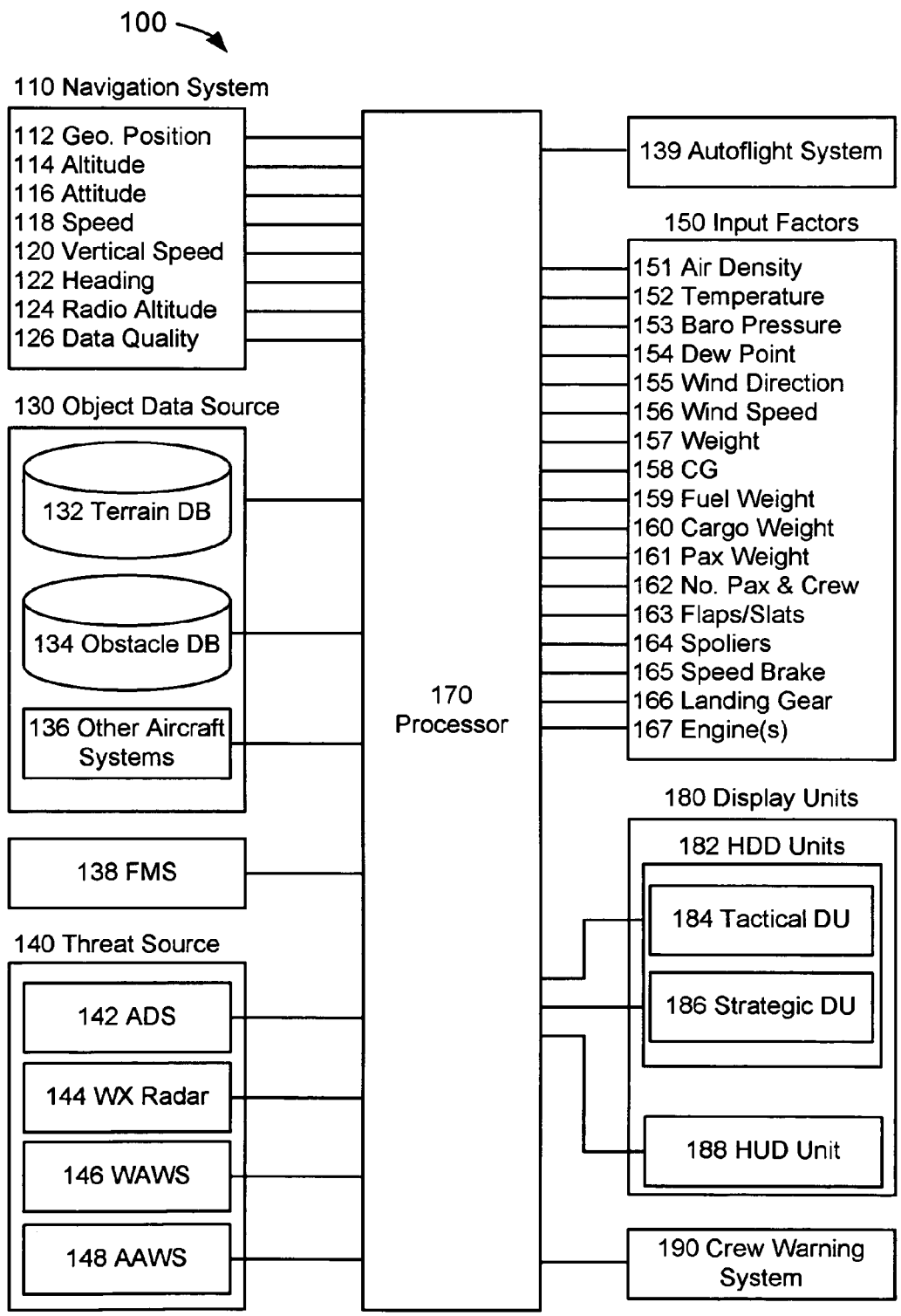
FIG. 1 depicts a block diagram of an aircraft flight path generation system.

FIG. 1 depicts a block diagram of an aircraft flight path generation system 100 suitable for implementation of the techniques described herein. The aircraft flight path generation system 100 of FIG. 1 may include a navigation system 110, an object data source 130, a flight management system 138, an autoflight system 139, input factors 150, a processor 170, display units 180, and crew alerting system 190.

In an embodiment of FIG. 1, a navigation system 110 comprises the system or systems that could provide navigation data containing information regarding the current state of the aircraft. It should be noted that data, as embodied herein for any source or system in an aircraft including a navigation system, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles. Aircraft includes an Unmanned Aerial Vehicle ("UAV"). A navigation system 110 may include, but is not limited to, an air/data system, an attitude heading reference system, an inertial guidance system (or inertial reference system), and a global navigation satellite system ("GNSS") (or satellite navigation system), all of which are known to those skilled in the art. For the purposes of the embodiments herein, a radio altimeter system may be included in the navigation system 110; a radio altimeter system is known to those skilled in the art for determining the altitude above the surface over which the aircraft is currently operating. As embodied herein, a navigation system 110 could provide navigation information including, but not limited to, geographic position 112, altitude 114, attitude 116, speed 118, vertical speed 120, heading 122, radio altitude 124, and data quality 126 to a processor 170 for subsequent processing as discussed herein.

Navigation data quality 126 may include, but is not limited to, accuracy, uncertainty, integrity, and validity for data provided by a navigation system 110. As embodied herein, aircraft position comprises geographic position (e.g., latitude and longitude coordinates) and altitude, and direction may be derived from either geographic position, aircraft position, or both. As embodied herein, aircraft orientation may include pitch, roll, and/or yaw information related to the attitude of the aircraft.

In an embodiment of FIG. 1, an object data source 130 may include, but is not limited to, a terrain database 132, obstacle database 134, and other aircraft systems 136, or any combination thereof. As embodied herein, object data may include terrain data, obstacle data, or both. An object data source 130 could comprise any source of terrain data, obstacle data, other manmade or natural features, geopolitical boundaries, or any combination thereof. Obstacles may include, but are not limited to, towers, buildings, poles, wires, other manmade structures, and foliage.

A terrain database 132 may be any database used to store terrain data contained in digital elevation models ("DEM"). Generally, the terrain data of a DEM is stored as grids composed of cells, and each grid or cell represents an area of terrain. A grid or cell may be of various shapes. For example, a grid or cell may be defined in arc-seconds of latitude and longitude, or may be rectangular, square, hexagonal, or circular. A grid or cell may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with the GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

It should be noted that data contained in any database discussed herein including a terrain database 132, obstacle database 134, and navigation database employed in a Flight Management System ("FMS") 138 may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle could be stored in an obstacle database 134, and a temporary runway closure could be stored in a navigation database 140. Any database used in the embodiments disclosed herein may be a stand-alone database or a combination of databases. For example, a terrain database 132 may be associated with a terrain awareness and warning system ("TAWS") only. In an alternative embodiment, terrain data could be stored in or combined with an airport database, airspace database, or with a database used by any other aircraft system including, but not limited to, an FMS 138, or an airspace awareness and warning system ("AAWS") 148.

Although other aircraft systems 136 could employ terrain databases 132, such systems could also be a source of terrain data provided to a processor 170. For example, a synthetic vision system ("SVS") may employ a terrain database and/or obstacle database to generate terrain image data. Here, the terrain database and/or obstacle database that is part of an SVS could be the source of object data. Alternatively, the SVS could provide a processor 170 with terrain data in the form of terrain image data.

In another alternative, other aircraft systems 136 could include a non-database terrain and/or obstacle acquisition system. For example, a radar-based TAWS system could provide real-time terrain and/or obstacle data which could be employed, like any other data source, in the real-time generation of approach and departure procedure data. Moreover, a non-database source of object data could be used to as a second source of such data that may be used in conjunction with or used as a source of redundant information that may be provided along with data stored in a database. Other examples of other aircraft systems 136 which could comprise sources of terrain data include, but are not limited to, an AAWS. As embodied herein, a terrain database 132, an obstacle database 134, and/or other aircraft systems 136 could provide data representative of objects to a processor 170 for subsequent processing as discussed herein.

In an embodiment of FIG. 1, an FMS 138 may perform a variety of functions performed to help the crew in the management of the flight, and such functions are known to those skilled in the art. Although not indicated in FIG. 1, navigation system 110 provides data representative of navigation to an FMS 138 including, but not limited to, those enumerated and discussed above. These functions could include receiving a flight plan and constructing a lateral and vertical flight plan components. A pilot could create a flight plan from waypoints stored in a database or select a flight plan stored in a database of the FMS 138. Also, a flight plan may be modified at any time. A flight plan could be used to guide an aircraft from one position to the next and to compute many flight parameters including, but not limited to, estimated time enroute, estimated time of arrival to a destination, estimated fuel consumption between waypoints, and BINGO (i.e., remaining flight time before returning to base without using fuel reserve). As embodied herein, a Mission Computer System ("MCS") incorporates the functionalities and capabilities of an FMS 138.

Typically, an FMS 138 contains a navigation database which could store data associated with a flight plan such as, but not limited to, ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, and GNSS Landing Systems.

In a lateral flight plan, the FMS could perform many functions including, but not limited to, navigational computations, radio navigation aids selections, and providing lateral flight information which could maintain the aircraft along the flight plan from takeoff to approach. In a vertical flight plan, an FMS could compute an optimum speed at each point, other characteristic speeds, and the aircraft weight and center of gravity. Then, it could compute predictions along the flight plan based on these speeds and weight. It could also provide vertical flight information in reference to such predictions. Other miscellaneous performance computations are also made. Computations and underlying algorithms performed by an FMS 138 are known to those skilled in the art.

A pilot or flight crew may initialize an FMS including, but not limited to, the selection of a flight plan, where such flight plan could provide the basis for all computations and displays. A flight plan may be composed of various lateral and vertical elements that may be defined during initialization, and it may be defined using navigation data stored in an FMS database.

Lateral elements of a flight plan could include origin airport and runway; a departure procedure ("DP") that may include, but is not limited to, a standard instrument departure ("SID"); an enroute transition; enroute airways and waypoints; an arrival procedure that may include, but is not limited to, an enroute transition, a standard terminal arrival route ("STAR") procedure, a STAR-approach transition, an approach procedure, a missed approach procedure, and a holding procedure; and a flight plan to an alternate airport. Such procedures may be defined by various legs and waypoints between legs.

Vertical elements could include a takeoff altitude which may include, but is not limited to, a thrust reduction and/or acceleration altitudes; altitude constraints at one or more waypoints located along the flight path; vertical speed and/or flight path angle constraints at one or more waypoints located along the flight plan; speed constraints at one or more waypoints along the flight plan; climb and descent speed limits; climb and descent step legs; and cruise flight levels. A vertical element could also include a cost index for the flight plan, a parameter that may determine flight time cost in units of fuel flow for providing fuel cost versus time cost information. The cost index could include a scale of optimization, where a low cost index may be associated with optimizing fuel consumption and a high cost index may be associated with optimizing time. These elements could be formulated into one or more aircraft performance constraints as discussed in detail below.

As noted above, a flight plan may be changed or revised at any time after initialization. For lateral elements, waypoints could be inserted or deleted, holding procedures could be inserted or modified, legs to fly directly to waypoints may be inserted, a DP or STAR procedure may be modified or introduced into the flight plan, the destination or alternate airport may be changed, and/or an offset flight path could be created to avoid one or more threats. For vertical elements, constraints associated with altitude, vertical speed, flight path angle, and speed between waypoints could be inserted, modified, or deleted; climb and descent speeds could be inserted, modified, or deleted as well as climb and descent step legs. Cruise flight levels and a cost index could be modified.

With respect to vertical elements, an FMS 138 may compute various speeds or mach numbers for the purpose of predicting time and fuel consumption. The predictions made by the FMS 138 may be based on phase of flight profiles using assumptions based on pre-computed allowances and may not take into account an actual flight profile established when an autopilot is engaged. Alternatively, such predictions may be based using assumption based on real-time measurements using one or more input factors 150 as discussed in detail below and/or could take into account an actual flight profile. In either scenario, one or more aircraft performance constraints could be used to facilitate such predictions. The following brief discussion regarding the use of prediction profiles for the various phases of flight is provided for the purpose of illustration only and not of limitation.

A prediction profile of a take-off phase of flight may assume an aircraft is flown with maximum take-off thrust at a specific speed or may use the actual take-off thrust and/or actual speed measured in real-time using one or more input factors 150 until a thrust reduction altitude is reached. Similarly, this could be followed with a prediction profile assuming the aircraft is flown with maximum climb thrust at a specific setting or with measured climb thrust until an acceleration altitude is reached. Then, a prediction profile of a climb phase may assume the aircraft is flown with maximum or measured climb thrust from the acceleration altitude until a climb speed selected by the pilot or aircrew is reached or the lower of an optimum speed, a climb speed limit, or a speed constraint is reached, thereby satisfying speed limits or constraints imposed upon the climb phase prediction profile; the pilot may select a speed.

As embodied herein, an FMS 138 could receive data input from other aircraft systems including, but not limited to, data representative of one or more flight modes and/or parameters selected and/or engaged by the pilot through a pilot interface system (e.g., a flight control panel) and used for engaging an aircraft's autoflight system 139. An autoflight system 139 could include systems such as, but is not limited to, a flight director ("FD") system, an autopilot system, and an autothrottle system. In addition, an FMS 138 could provide data representative of a flight plan to other aircraft systems including, but not limited to, an autoflight system 139 and processor 170 (if such processor is not part of an FMS 138) where such data could be used by an autopilot system. Also, data representative of the flight plan may used as a basis for presenting a highway in the sky on a tactical display unit as described Barber in a U.S. patent application Ser. No. 12/284,561 entitled "System, Module, and Method for Presenting a Flight Director-Dependent HITS Pathway on an Aircraft Display," which is incorporated by reference in its entirety.

A FD system as embodied herein comprises a system that could provide lateral and vertical guidance based on data received from other aircraft system(s), panel(s), and/or component(s) including, but not limited to, a FMS 138 and a pilot interface system. Lateral and vertical guidance may be provided to the pilot by depicting a flight director (i.e., symbology of a flight director) on a tactical display unit 184. Also, lateral and vertical guidance may be provided to an autopilot system for controlling the position of control surfaces on the roll, pitch, and/or yaw axes and to an autothrottle system for controlling engine thrust. The determination of guidance data may be computed by an FD system through the use of guidance algorithm(s) by applying the data received from other aircraft systems to the guidance algorithm(s). The knowledge and use of guidance algorithm(s)—and the application of the received data to the guidance algorithm(s)—are known to those skilled in the art.

A pilot may want to follow a flight plan of an FMS 138 for lateral guidance and/or vertical guidance or manually provide lateral and/or vertical guidance. After the pilot has made his or her selection(s), data representative of the pilot's selections may be provided to an FD system. Through the application of this data to guidance algorithms, an FD system may compute and provide lateral and vertical guidance to a tactical display unit 184 and/or autopilot system.

In an embodiment of FIG. 1, a threat source 140 could be any source that may provide data representative of hazardous flight conditions. One threat source could be an aircraft defense system ("ADS") 142 installed in an aircraft for providing threat information of hostile military weaponry to the pilot. An ADS 142 could obtain threat information from detection systems internal to the aircraft, external to the aircraft, or both. For example, an ADS 142 could employ onboard sensors or other components used in an aircraft to receive data representative of threat information identifying the location and/or type of threat (e.g., an air-to-ground missile) from which a zone of threat could be determined. In another example, an ADS 142 could employ a datalink system used to receive data representative of threat information or a threat zone from an external source such as, but not limited to, another aircraft or satellite.

Another threat source 140 could be a weather radar system 144 installed in an aircraft for providing threat or hazardous information related to meteorological conditions to the pilot. A weather radar system 144 includes any system capable of detecting hazardous or significant meteorological conditions and providing data representative of such conditions. Typically, a weather radar system 144 employs an antenna for measuring the range and azimuth to such conditions, where such measurements may be used to identify the location and/or type of threat (e.g., light precipitation, moderate precipitation, severe precipitation, etc. . . . ) from which a zone of threat could be determined.

Another threat source 140 could be a weather awareness and warning system ("WAWS") 146 installed in an aircraft for providing threat or hazardous information related to meteorological conditions. In a WAWS 146, weather data may be transmitted to an aircraft in flight through a datalink system that could originate from or be provided by a plurality of sources including, but not limited to, XM Satellite Radio, Inc., a provider of satellite weather data services. The weather data could contain three-dimensional delineations of a defined weather area. Weather data that may be broadcast could include data contained in a variety of weather products such as, but not limited to, Significant Meteorological Information ("SIGMET"), Airmen's Meteorological Information ("AIRMET"), Aviation Routine Weather Report ("METAR"), Next-Generation Radar ("NEXRAD"), surface analysis weather maps, surface pressure, surface wind speed and direction, winds aloft, wind shear detection, echo tops, and freezing levels. A WAWS 146 could determine a weather alert zone. A WAWS 146 is described by Frank et al in a U.S. patent application Ser. No. 12/217,457 entitled "System and Method for Generating Alerts Signals in a Weather Awareness and Warning System," which is incorporated by reference in its entirety.

Another threat source 140 could be an AAWS 148 installed in an aircraft for providing threat or hazardous information related to airspace to the pilot. The airspace data could contain three-dimensional delineations of a defined airspace area. Regulatory special use airspace data may be comprised of, in part, prohibited areas and restricted areas. Non-regulatory special use airspace data may be comprised of, in part, military operations areas, alert areas, warning areas, and national security areas. Prohibited areas contain airspace of defined dimensions identified by an area within which the flight of aircraft is prohibited. Such areas may be established for safety, security, national defense, national welfare, or other reasons. Restricted areas contain airspace within which the flight of aircraft, while not wholly prohibited, is subject to restrictions. Restricted areas may denote the existence of unusual, often invisible, hazards to aircraft such as artillery firing, aerial gunnery, or guided missiles. Penetration of restricted areas without authorization from a using or controlling agency may be extremely hazardous to the aircraft and its occupants. An AAWS 148 could determine an airspace alert zone. An AAWS is described by Wichgers in a U.S. Pat. No. 7,714,744 entitled "System and Methods for Generating Alerts Signals in an Airspace Awareness and Warning System," which is incorporated by reference in its entirety.

In an embodiment of FIG. 1, input factors 150 are determining factors which may be used to determine one or more aircraft kinematic constraints or factors as disclosed in detail below. Input factors 150 may be provided by a plurality of aircraft systems or components thereof. Input factors 150 could include real-time system or sensor data, signal input from a plurality of aircraft systems or sensors, and information from any database or source. As embodied herein, an input factor 150 could provide data or a signal of any form containing information that may be provided to and received by a processor 170.

As embodied herein, input factors 150 could include those inputs defined above as being part of the navigation system 110 (e.g., geographic position 112, altitude 114, attitude 116, speed 118, vertical speed 120, heading 122, radio altitude 124, and navigation data quality 126). Moreover, any input provided by a navigation system 110 could be considered an input factor for the purposes of the embodiments herein. In other words, a navigation system 110 may be considered as providing a subset of input factors 150. The presentation of the specific inputs from navigation system 110 should not be construed as an exclusion or limitation to input factors 150. As embodied herein, input factors 150 may include information from any data or information source available to a processor 170 including, but not limited to, an object data source 130 and a threat source 140. In other words, an object data source 130 and a threat source 140 may be considered as sources providing a subset of input factors 150. The presentation of an object data source and a threat source as separate item numbers 130 and 140 should not be construed as an exclusion or limitation to input factors 150.

In an embodiment herein, input factors 150 may be selected by a manufacturer or end user as a determining factor for one or more criteria used in an equation that could define one or more aircraft kinematic constraints. When included in an equation, data representative of input factors 150 may be acquired by or through aircraft systems and sensors as discussed above and provided as input to a processor 170. When received, the processor 170 may process the data in accordance with one or more aircraft kinematic constraint algorithms. As a result, the processor 170 may determine one or more aircraft kinematic constraints based upon the application of the real-time dynamic or static input factors 150.

One or more aircraft performance constraints may be defined using one or more selected climb criteria, each of which may be dependent on one or more input factors 150. The application of such climb criteria and input factors 150 by a processor 170 may determine real-time predictable and achievable aircraft performance using input factors 150. Although a manufacturer or end user may define aircraft performance using one criterion such as an aircraft's maximum gross weight (as will be discussed below in detail) that may be independent of input factors 150, the advantages and benefits of the embodiments herein exploit the ability of a processor 170 to receive a plurality of available input factors 150, apply them to aircraft performance constraints defined and contained in an algorithm, and determine aircraft performance unique to actual conditions of flight operations as measured by the values of the input factors 150.

To provide a simple example of how input factors 150 may be used in the embodiments herein, suppose an aircraft performance constraint comprises meteorological or environmental criteria such as pressure altitude, temperature, wind, and weight. Those skilled in the art understand that aircraft performance may be affected by a plurality of factors including, but not limited to, pressure altitude, temperature, humidity, wind, and weight. Here, determining factors representing altitude 114, temperature 152, barometric pressure 153, dew point 154, wind direction 155, wind speed 156, and current weight 157 may be provided as input factors 150 to processor 170 for subsequent processing in accordance with the criteria that defines aircraft performance. A processor 170 is able to define aircraft performance in real-time because it is based upon input factors 150.

In the following paragraphs, other examples of aircraft performance are provided to illustrate the ability with which a manufacturer or end user may define a aircraft performance constraints as embodied herein. These illustrations are intended to provide exemplary climb criteria and performance factors that may be used in a aircraft path generation system 100, and are not intended to provide a limitation to the embodiments discussed herein in any way, shape, or form.

As noted above, input factors 150 may include some of those inputs provided to a processor 170 by a navigation system 110, even though they are not enumerated under item 150 of FIG. 1; input factors that could affect the performance of the aircraft may include some inputs that are provided by any aircraft system other than a navigation system 110. As embodied herein, one or more input factors 150 could be included in the computation of another input factor. For instance, wind direction 155 and wind speed 156 have been considered in a computation of speed 118, and barometric pressure 153 could have been considered in a computation of altitude 114. In such instances, a processor 170 may be programmed to accept only one of these factors.

In another example, aircraft performance could include weight and balance climb criteria. If so, input factors 150 could include, but are not limited to, data representative of aircraft empty weight 157, center of gravity ("CG") 158, weight of fuel 159, weight of cargo 160, weight of passengers 161, and number of passengers and crew 162 (for which a standard weight can be applied). In another example, aircraft performance could include aircraft climb configuration and system climb criteria. If so, input factors 150 could include, but are not limited to, data representative of an aircraft's flaps and slats 163, spoilers 164, speed brake 165, and landing gear 166 configurations. In another example, a aircraft could include engine performance climb criteria. If so, input factors 150 could include, but are not limited to, data representative of engine performance or status 167 or available thrust. In another example, the determination of aircraft could include an assumption that one engine of a multi-engine aircraft is inoperative.

In another example, flight operational constraints may include those factors such as, but not limited to, minimum leg distances of the reference flight path and/or design standards or criteria of flight paths that may be employed by an aviation governing authority as discussed in detail below. If so, input factors 150 could include, but are not limited to, data representative of speed 118 and flight management data associated with an FMS 138.

A processor 170 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. A processor 170 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, a processor 170 could be a processor(s) used by or in conjunction with any other system of the aircraft including, but not limited to, a processor(s) associated with a navigation system, an FMS, an autoflight system, a TAWS, a vision system, or any combination thereof; for example, although depicted separately in FIG. 1, processor 170 could be included or made part of FMS 138 or any of the other separately enumerated systems.

A processor 170 may be programmed or configured to receive as input data representative of information obtained from various systems and/or sources including, but not limited to, navigation system 110, object data source 130, an FMS 138, a threat source 140, and input factors 150. As embodied herein, the terms "programmed" and "configured" are synonymous. A processor 170 may be electronically coupled to systems and/or sources to facilitate the receipt of input data; as embodied herein, operatively coupled may be considered as interchangeable with electronically coupled. A processor 170 may be programmed or configured to execute the methods discussed in detail below. A processor 170 may be programmed or configured to provide output data to various systems and/or units including, but not limited to, display units 180, and a crew alerting system 190. A processor 170 may be electronically coupled to systems and/or units to facilitate the providing of output data representative of a procedure. It is not necessary that a direct connection be made; instead, such receipt of input data and the providing of output data could be provided through a data bus or through a wireless network.

Display units 180 may include, but are not limited to, HDD units 182 units and HUD 188 units. As embodied herein, a display unit which may display approach or departure information. Display units 180 may display image from data produced by one or more vision systems such as, but not limited to, an SVS, an enhanced vision system ("EVS"), or a combined SVS-EVS. HDD units 182 are typically units mounted to an aircraft's flight instrument panel located in front of a pilot and below the windshield and the pilot's field of vision. As embodied herein, tactical flight information displayed on a tactical display unit 184 could be information relevant to the instant or immediate control of the aircraft, whether the aircraft is in flight or on the ground. A tactical display unit 184 could display the same information found on a primary flight display ("PFD"), such as "basic T" information (i.e., airspeed, attitude, altitude, and heading). Although it may provide the same information as that of a PFD, tactical display unit 184 may also display a plurality of indications or information including, but not limited to, flight route, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. A tactical display unit 184 is designed to provide flexible configurations which may be tailored to the desired configuration specified by a buyer or user of the aircraft.

A strategic display unit 186 could be a unit which presents information to the crew relative to the intended future state(s) of the aircraft (e.g. intended position in space at specified times) along with information providing contextual information to the crew (e.g. terrain, navigation aids, geopolitical boundaries, airspace boundaries, etc.) about such state(s). One example of such display unit is commonly referred to as a Navigation Display. In some configurations, the strategic display unit could be part of an Electronic Flight Information System ("EFIS"). On these systems, terrain information may be displayed simultaneously with information of other systems. In one embodiment herein, terrain information may be displayed simultaneously with weather and/or threat information with no loss or a negligible loss of displayed information.

As embodied herein, display units 180 may include a vision system (not shown) which generates an image data set which represents the image displayed on a display unit. Vision systems include, but are not limited to, SVS, EVS, combined SVS-EVS, or combination thereof. As embodied herein, approach procedure or departure data could be included, in part or in whole, in the generation of an image data set. As embodied herein, the image represented the image data set could include an image of a flight route corridor.

A crew alerting system 190 includes those systems that provide, in part, aural, visual, and/or tactile stimulus presented to attract attention and convey information regarding system status or condition. A crew alerting system 190 may include, but is not limited to, an aural alert unit for producing aural alerts, a display unit for producing visual alerts, and a tactile unit for producing tactile alerts. Aural alerts may be discrete sounds, tones, or verbal statements used to annunciate a condition, situation, or event. Visual alerts may be information that is projected or displayed on a cockpit display unit to present a condition, situation, or event to the pilot. Tactile alerts may be any tactile stimulus to present a condition, situation, or event to the pilot. In addition, alerts may be based on conditions requiring immediate crew awareness or attention. Caution alerts may be alerts requiring immediate crew awareness in which subsequent corrective action will normally be necessary. Warning alerts may be alerts for detecting terrain threat that requires immediate crew action. Both caution and warning alerts may be presented as aural alerts, visual alerts, tactile alerts, or in any combination thereof. When presented visually, one or more colors may be presented on a display unit indicating one or more levels of alerts. For instance, amber or yellow may indicate a caution alert and red may indicate a warning alert.

In one embodiment, an aural alert could call out "Caution, missile threat" when the conditions for a caution alert have been met or "Warning missile threat." when the conditions for a warning alert have been met; as embodied herein, a manufacturer or end-user could establish a distance(s) from a threat zone for providing caution and/or warning alert(s) before the threat zone is penetrated. As embodied herein, the location of such distances could be determined by a manufacturer as either a fixed or variable distance from the edge of such zone(s). In another embodiment, a visual message could display "Caution, missile threat" text when the conditions for a caution alert have been met or "Warning missile threat" text when the conditions for a warning alert have been met. In another embodiment, a text message could be displayed in color, e.g., the "caution, terrain" text could be displayed in amber and the "missile threat, turn right" could be displayed in red. In another embodiment, the terrain that is causing the alert could be indicated visually, aurally, and/or tactilely, in any combination. In another embodiment, the aural and visual alerts could be presented simultaneously. In another embodiment, the alert could be issued along with one or more recommendations and/or guidance information corresponding to the alert condition including, for example, the audio and/or visual indication of "Warning, missile threat. Turn right."

Figure 2A:
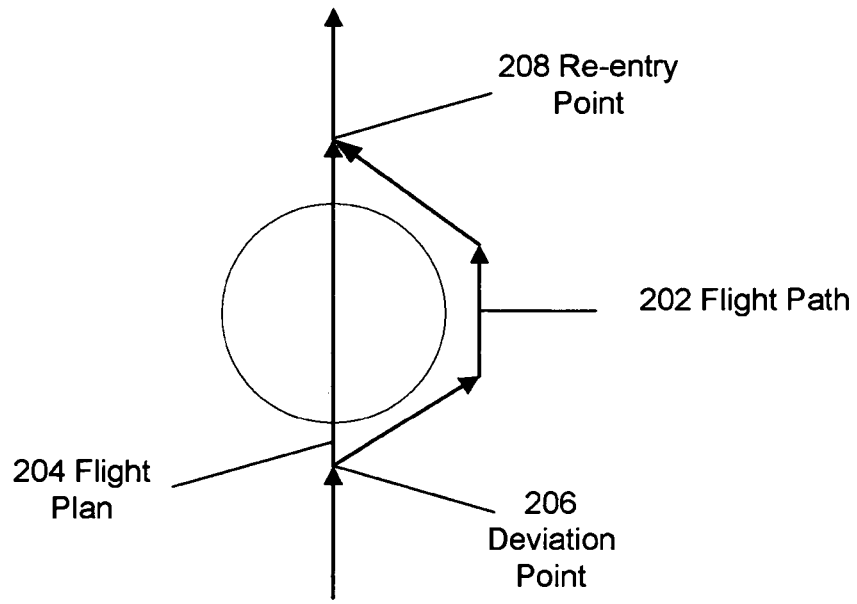
FIG. 2A illustrates a flight path between deviation and re-entry points associated with a flight plan.

The advantages and benefits of the embodiments disclosed herein may be illustrated by discussing the generation of a flight path 202 between two points associated with a flight plan 204 as shown in FIG. 2A; for the purposes of discussion only, these points will be referred to as a deviation point 206 and a re-entry point 208. As embodied herein, a layered approach may be followed to provide a near-optimal solution that is better than or equivalent to a solution generated by a pilot. A layered approach may increase real-time efficiency that is essential for long-range, in-flight re-planning. Also, a layered approach enables a transformation of an NP-Complete problem to an efficient problem solvable in real-time. In one embodiment herein, the layers could include the extraction of free space corresponding to a flight plan, a determination of a reference path, and a refinement of the reference path. In an additional embodiment, an additional layer could include the extraction of free space in a threat zone if threat zone data is received.

Figure 2B:
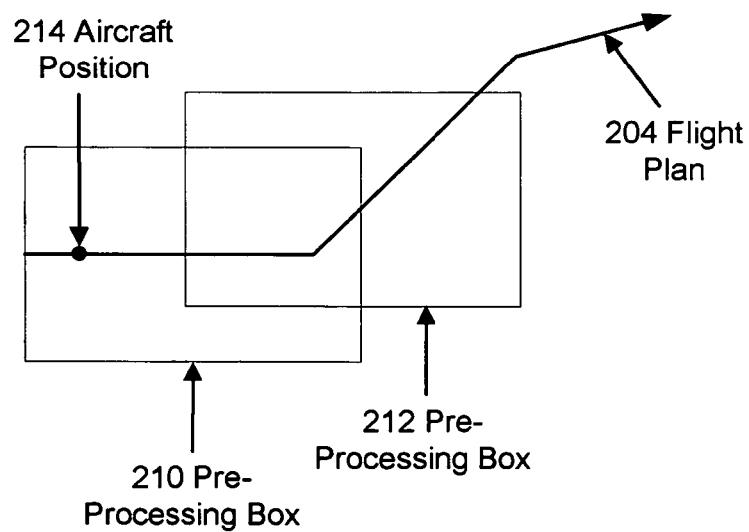
FIG. 2B illustrates the use of pre-processing boxes centered on the flight plan for the purpose of extracting free cells.

In one layer, objects such as terrain and/or obstacles may be bounded and 3D free cells may be extracted. The extraction of free cells may be accomplished by using a sliding box approach that employs one or more pre-processing boxes 210 and 212 sliding along the flight plan 204 from the aircraft position 214 as shown in FIG. 2B, where each pre-processing box could be centered on the flight plan. The number of pre-processing boxes could be configurable by the pilot or end-user; however, a minimal number of pre-processing boxes may be desired to maximize processor efficiency. For example, two boxes could be utilized, one that corresponds to the current position of the aircraft and a second for future position of the aircraft along the flight plan. Also, the size of each pre-processing box could be configurable by the pilot or end-user where the size could depend on the mission or normal utilization of the aircraft, where a smaller size provides for better processor efficiency.

After the pre-processing boxes have been defined, a recursive space decomposition technique may be employed within the boundaries of the pre-processing boxes to extract free cells to define the traversable space. Examples of recursive spatial decomposition techniques include, but are not limited to, Octree and modified Octree ("MOctree"). Octree and MOctree are described in detail in Appendix A of the Airborne E* publication, with MOctree providing a distinct and favorable advantage for aircraft because the dimensions of such cells may be adapted to meet aircraft performance requirements and/or to conform or nearly conform with design standards or criteria of flight paths. It should be noted that, although the following discussion may be drawn to the MOctree recursive space decomposition technique, the embodiments disclosed herein are not limited to such technique.

In another layer, a reference path comprising a plurality of flight legs between waypoints may be determined. Using the flight plan, a reference path may be determined between two points along the flight plan. A flight plan could be comprised of a sequence of waypoints stored in a database of the FMS 138, where two adjacent waypoints comprise a flight leg. A flight plan comprised of known waypoints may produce a series of flight legs which are dependent on known waypoints stored in a database. As such, rigid adherence to using known or established waypoints may not produce a direct route between waypoints. A path planning algorithm such as, but not limited to, the Focused D* algorithm may be used to compute the reference path based on the inter-connected Free cells, where such reference path may provide a better or shorter path because it may not be limited to using known waypoints.

In another layer, the reference path may be refined to take into account aircraft performance constraints and flight operational constraints; without path refinement, the reference path may not be flyable due to the lack of consideration of aircraft kinematic constraints. A search technique for finding an approximate solution to a search problem such as, but not limited to, a Genetic Algorithm ("GA") may be used to ensure the flight path refined from the reference path complies with the aircraft performance constraints and flight operational constraints. It should be noted that, although the following discussion may be drawn to GA, the embodiments disclosed herein are not limited to such algorithm.

In an additional embodiment, threats may be bounded and 3D free cells may be extracted as part of another layer. Examples of threats include, but are not limited to, hostile military weaponry and meteorological conditions. For each threat, the MOctree technique may be employed to determine the smallest MOctree cell, η, encompassing the threat zone. Then, the MOctree technique may be used to decompose the 3D terrain and the volume covered by the threat in q. The extraction of free cells may be accomplished by defining a search box based on a deviation point 206 and re-entry point 208 from a flight plan 204, between which the reference path could be determined. Any portion of the search box falling outside of a pre-processing box of the first layer will be ignored.

The 3D space that is inside the threat zone and is completely free of terrain may be counted or identified as a pseudo-free cell at this stage that will be checked later for terrain masking. The 3D space inside η may be re-divided to take into account both terrain and threat information. Because of this re-division, free cell information inside η that was determined in the first layer may be ignored since they are based on terrain only. This re-division is preferable because it could eliminate any complexity involved in finding free cells that intersect with the boundary of the threat zone.

After the 3D space is decomposed in the selected cell, all pseudo-free rectangular cells inside the threat zone may be checked for terrain masking (i.e., intervisibility check) with the threat. If terrain masking is not required, all pseudo-free cells could be counted as full cells. If terrain masking is required, four (4) line of sight ("LOS") vectors between the pop-up threat and the four corners of the top surface of each pseudo-free rectangular cell are checked for terrain blockage. If the LOS vectors penetrate through terrain, the rectangular cell may be counted as a free cell. The free cells inside q are re-connected back with other free cells inside the search box.

Figure 3:
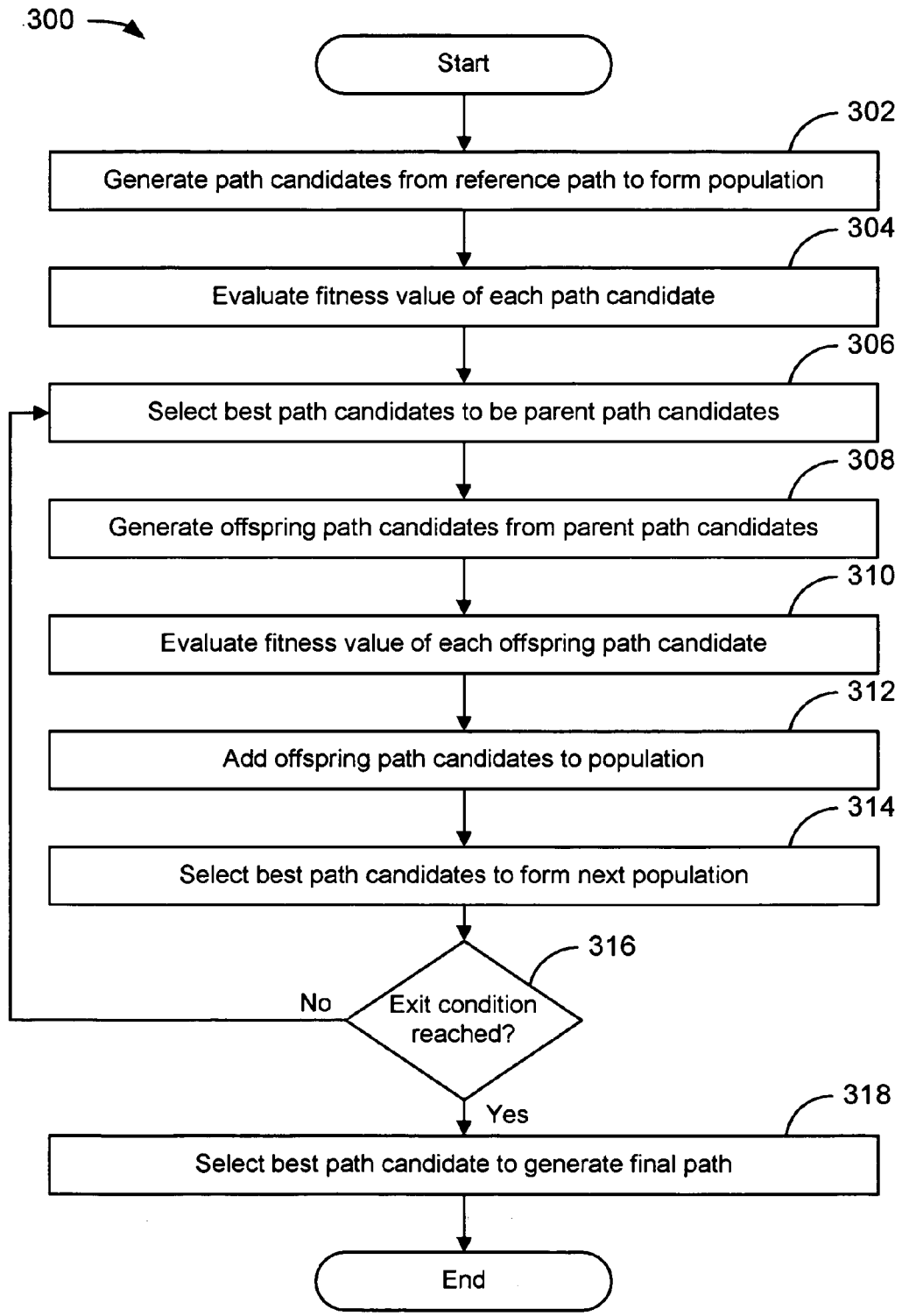
FIG. 3 depicts a flowchart of a method for constructing a flight path.

FIG. 3 depicts a flowchart 300 of constructing a flight path by employing a GA to refine a reference path. The flowchart beings with module 302 with the generating of an initial population $P_0$ of path candidates (singularly, G) from the seed path (i.e., reference path) by using one of a plurality of genetic operators for each flight leg of the seed path, where a genetic operator has an equal probability of being selected from the others. For example, an initial population $P_0$ could comprise of sixteen (16) path candidates which includes the seed path. It should be noted that, as used herein, i indicates a flight leg, and n indicates the number of flight legs for path candidate G. The coordinates for waypoints are assumed to be $(x_i, y_i, z_i)$ in local East, North, Up ("ENU") coordinates.

Genetic operators that may be employed by GA include, but are not limited to, a blending cross-over, a delete mutator, an insert mutator, a perturb mutator, a rotate mutator, a smooth mutator, and a fixed-vector mutator. A blending crossover operator may be used to combine two parent path candidates into two offspring candidates and applied to path candidate G, which may be feasible or infeasible as discussed below. A blending crossover operator may be determined by Formula 4-1 shown in FIG. 4.

A delete mutator operator may remove a waypoint $W_i$ from a path candidate G, where the waypoint may be randomly selected using by Formula 4-2 shown in FIG. 4. It should be noted that a flag β in the delete mutator operator (and other mutator operators) could be set to true when the deviation and/or re-entry angle(s) need to be altered to meet flight specifications.

An insert mutator operator may insert a waypoint into path candidate G. The operator may randomly insert a waypoint on the perpendicular line bisecting a selected flight leg having a length at least two times longer than the minimum leg length l. The length of the perpendicular line may be half the size of the leg segment and placed so that the leg segment bisects the perpendicular line. This operator randomly selects a flight leg that is at least two times longer than the minimum leg length l and randomly selects a point on the perpendicular line.

A perturb operator may perturb the coordinates of the waypoints on the path candidate G. A waypoint is randomly selected from a candidate list of waypoints initially violating turn, climb, or descent angle constraints and their neighbors. New waypoint $W_i'$ may be determined by Formula 4-3 shown in FIG. 4. As shown beneath Formula 4-3, the coordinates at current waypoint $W_i$ is perturbed to be new waypoint $W_i'$ on the bisector of previous waypoint $W_{i-1}$ and future waypoint $W_{i+1}$ by a randomly selected value γ between current waypoint $W_i$ and the midpoint m.

A rotate mutator operator may rotate the coordinates of the waypoints on the path candidate G. Waypoint $W_i$ may be randomly selected using Formula 4-4 shown in FIG. 4. For a waypoint $W_i$ in the set [2, N−3], a radius r is randomly chosen between [0, ($W_{i+1}$ and $W_{i-1}$)/2] and an angle θ is randomly chosen between (0, 2π). Then, $W_i$ is rotated by (r, θ) around the midpoint of a line formed by $W_{i-1}$ and $W_{i+1}$ as shown beneath Formula 4-4. When deviation and re-entry angles need to be set (β=true), then $W_1$ and $W_{n-2}$ can be selected. These two nodes are handled differently than all the other nodes. $W_1$ is rotated relative to the start node, $W_0$, by a random angle between (0, δ), where δ is the bearing difference of the desired heading and the current heading. $W_{n-2}$ is rotated about the end node, $W_{n-1}$, by a random angle between (0, δ), where δ is the bearing difference of the desired heading and the current heading.

A smooth mutator operator may smooth a sharp angle by inserting a new waypoint in each of two consecutive flight legs that form the sharp turn and deleting the original waypoint that connects these two flight legs. The new waypoint is inserted at the middle of the flight leg. A waypoint is randomly selected from a candidate list that originally has waypoints that violate turn, climb, or descent angle constraints and their neighbors.

A fixed vector mutator operator may only be used to meet the deviation and re-entry length constraints and may be applied to the waypoint just after the deviation point or just ahead of the re-entry point (i.e., goal point). If this operator is selected, the coordinates of the first waypoint or (n−2)th waypoint may be modified by Formula 4-5 shown in FIG. 4 (the (n−2)th waypoint is used as the example).

Returning to FIG. 3, the flowchart continues with module 304 with the evaluating of the fitness value F of each path candidate G, where the fitness value F may be evaluated using one or more aircraft performance constraints and/or flight operational constraints. The fitness value of each path candidate F(G), whether path candidate G is feasible or infeasible, may be determined using Formula 5-1 shown in FIG. 5, where Path_Cost(G) is the sum of the lengths of all flight legs or the accumulated flight time for path candidate G, $C_{max}$ is the maximum path cost for the worst feasible path, and NPC(G) is the normalized penalty cost of the path candidate that may be determined using Formula 5-2 shown in FIG. 5. In one embodiment, weighting factor w of Formula 5-2 may be chosen to have the same value. As observed by Formula 5-2, normalized penalty cost NPC(G) may be determined as a function of individual normalize penalty costs NP associated with the following constraints.

Aircraft performance constraints may include those factors affecting aircraft performance such as, but not limited to, maximum turn angle, maximum climb and descent angles, desired deviation and re-entry angles, and free of objects (e.g., terrain and obstacles). Flight operational constraints may include those factors such as, but not limited to, minimum leg distances of the reference flight path and design standards or criteria of flight paths that may be employed by an aviation governing authority (e.g., United States Standards for Terminal Instrument Procedures known as the "TERPS"). The employment of TERPS criteria used to generate an aircraft approach path is described by Barber et al in a U.S. patent application Ser. No. 12/283,399 entitled "System, Module, and Method for Generating Procedure Data Used in an Avionics System," which is incorporated by reference in its entirety.

The maximum turn angle constraint may be determined by Formula 5-3 shown in FIG. 5, where $a_i=(x_{i+1}-x_i, y_{i+1}-y_i)$ (i.e., $a_i$ is the horizontal vector of flight leg i) and $\phi_{max}$ is the maximum turn angle; the normalized penalty cost $NP_\phi$ for this constraint may be determined by Formula 5-4 shown in FIG. 5. The maximum climb and descent angles constraint may be determined by Formula 5-5 shown in FIG. 5, where $a_i=(x_{i+1}-x_i, y_{i+1}-y_i)$ (i.e., $a_i$ is the horizontal vector of flight leg i) and $\theta_{max}$ is the maximum climb or descent angle; the normalized penalty cost $NP_\theta$ for this constraint may be determined by Formula 5-6 shown in FIG. 5. The desired deviation and approach re-entry angles constraint may be determined by Formula 5-7 shown in FIG. 5; the normalized penalty cost $NP_\phi$ for this constraint may be determined by Formula 5-8 shown in FIG. 5. Regarding the free of objects constraint, if any portion of a flight leg is inside the object, the normalized penalty cost $NP_T$ may be determined by Formula 5-9 shown in FIG. 5. The minimum leg distance constraint may be determined by Formula 5-10 shown in FIG. 5; the normalized penalty cost NP; for this constraint may be determined by Formula 5-11 shown in FIG. 5. It should be noted that a manufacturer or end-user is not limited to any or all of the preceding constraints but may include or develop new or additional constraints.

Returning to FIG. 3, the flowchart continues with module 306 with the selecting of a number of the best path candidates from the initial population $P_0$ based upon their respective fitness value F to become parent paths. For example, ten (10) of the path candidates with the best fitness values of the initial sixteen (16) path candidates could be selected to become parent paths. As embodied herein, this commences a generation cycle.

The flowchart continues with module 308 with the generating of offspring path candidates from the parent paths, where one genetic operator is applied to each parent path after being selected using equal probability. The flowchart continues with module 310 with the evaluating of the fitness value F of each offspring path candidate, where such evaluation may be performed using the same evaluation technique performed in module 304.

The flowchart continues with module 312 with the adding of the offspring path candidates to the population $P_0$ to increase the population $P_0$. For example, the addition of ten (10) offspring candidates increases the population to twenty-six (26) path candidates. The flowchart continues with module 314 with the selecting of a number of the best path candidates from the increased population $P_0$ based upon their respective fitness value F and moving them into the next population $P_1$ to become parent paths. For example, sixteen (16) offspring candidates may be selected from the population of twenty-six (26) path candidates based upon their respective fitness value F. As embodied herein, this completes the generation cycle.

The flowchart continues with module 316 with the determining whether an exit condition has been met. If an exit condition has not been met, the generation cycle of modules 306 through 314, inclusive, may be repeated on the now current population $P_i$ and subsequent populations until an exit condition has been met. In one embodiment herein, an exit condition could be set after a preset number of generating cycles (e.g., 60 generating cycles) has been accomplished. In another embodiment herein, an exit condition could be set when a preset number of feasible paths (e.g., 10 feasible paths) exist and the difference of the average path cost of the top path candidates (e.g., 10 top path candidates) from the previous generation to the current generation is smaller than a percentage of the minimum leg requirement.

The flowchart continues with module 318 with selecting of the path candidate with the best fitness value when an exit condition has been met, where such path candidate may be used to generate the flight path. Then, the flowchart proceeds to the end.

Figure 6:
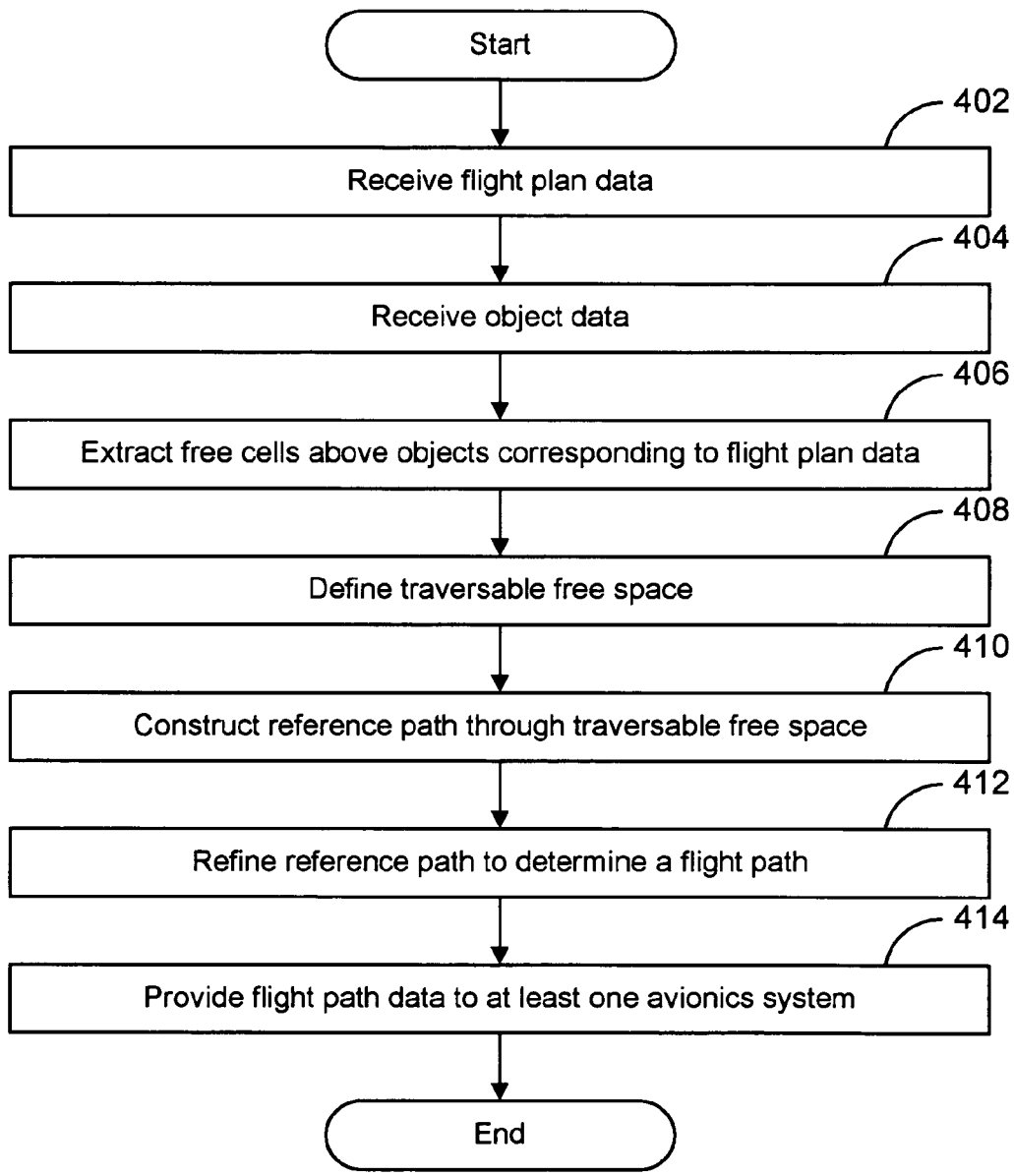
FIG. 6 depicts a flowchart of a second method for constructing a flight path.

FIG. 6 depicts a flowchart 400 of an example of a method for constructing a flight path used in an avionics system. The flowchart begins with module 402 with the receiving of flight plan data containing information related to a flight plan. As embodied herein, such data may be provided by an FMS 138.

The flowchart continues with module 404 with the receiving of object data. Object data may be received from an object data source may include, but is not limited to, a terrain database 132, an obstacle database 134, other aircraft systems 136, or any combination thereof. As embodied herein, object data could include terrain information, obstacle information, or both. A terrain database 132 may be associated with a TAWS. As discussed above, an SVS system could provide a source of object data. In addition to database sources of object data, a non-database terrain and/or obstacle acquisition system could provide a source of object information. Such system may include, but is not limited to, a radar-based TAWS system.

The flowchart continues with module 406 with the extracting of free cells above terrain or other objects corresponding to a flight plan. The extracting of free cells may be accomplished by using a sliding box approach that employs a pre-processing box sliding along the flight path, where the pre-processing box could be centered on the flight path. Once the pre-processing boxes have been defined, a recursive space decomposition technique may be employed within the boundaries of the pre-processing boxes to extract free cells that are inter-connected together. As embodied herein, examples of recursive spatial decomposition techniques include, but are not limited to, Octree and MOctree. Here, the extracted free cells may be considered as available free cells.

The flowchart continues with module 408 with the determining of traversable free space from the available free cells. The flowchart continues with module 410 with the construction of a reference path between two points on flight plan. In one embodiment, the points may or may not be established or known waypoints. In another embodiment, the points could be manually selected by a pilot in an effort to obtain a more direct route than the route of the flight plan including, but not limited to, those points used as beginning and ending waypoints; although a typical flight plan may comprise of series of waypoints, a flight plan could comprise a single leg between waypoints associated with a departure and destination from which a path planning algorithm may be applied. Given these points, a path planning algorithm such as, but not limited to, the Focused D* real time path re-planning algorithm may be applied to compute the reference path based on the traversable free space.

The flowchart continues with module 412 with the refining of a reference path to determine a flight path. Such reference path refinement may be accomplished by the method discussed above and shown on flowchart 300.

The flowchart continues with module 414 with the providing of data representative of the flight path to at least one avionics system or component thereof. As embodied herein, such avionics systems could include, but are not limited to, an FMS, a vision system, an autoflight system, and/or a display unit system. In an additional embodiment, such data could include flight plan data not affected by the construction and refinement of the reference path. Then, the flowchart proceeds to the end.

Figure 7:
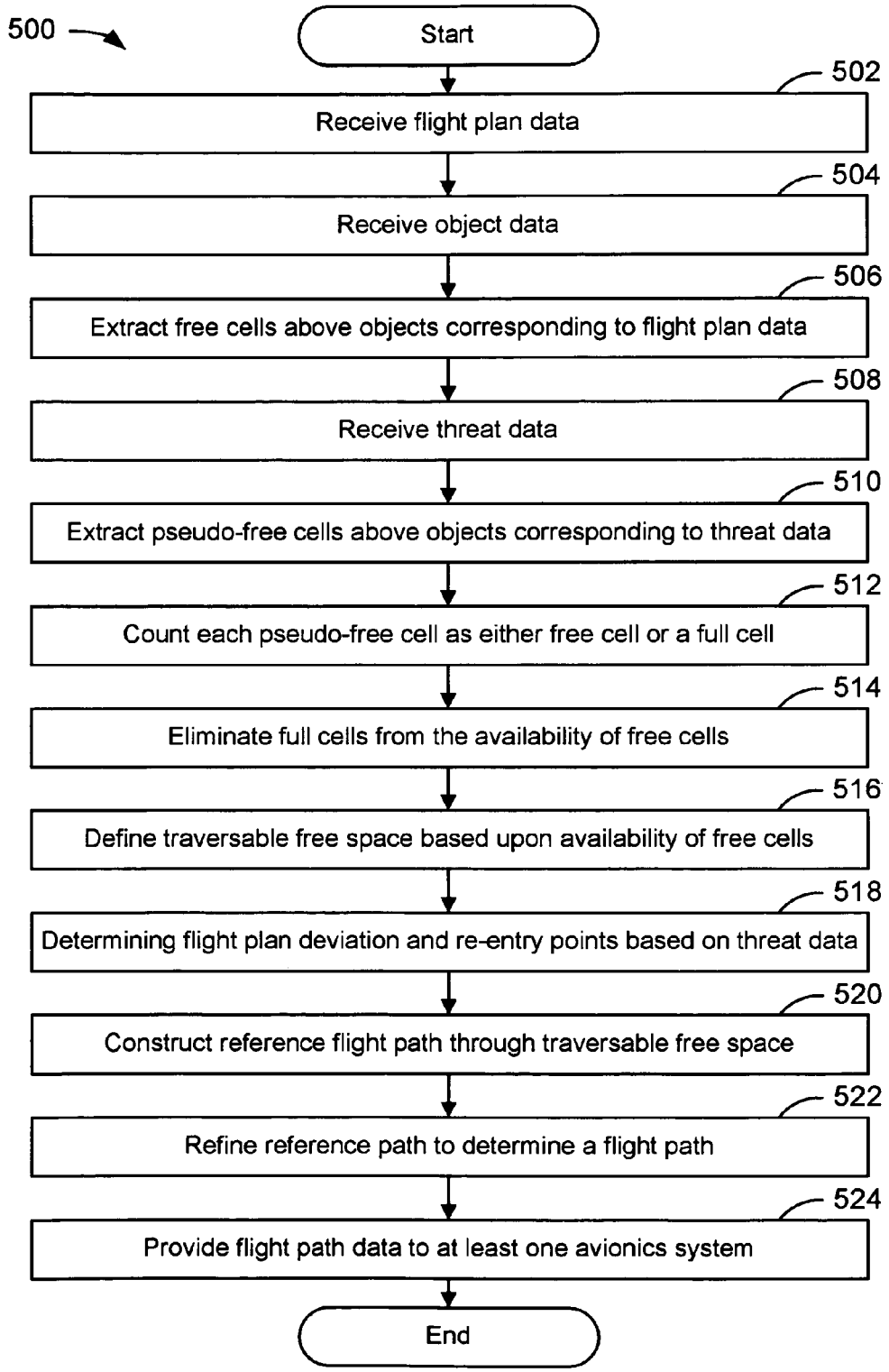
FIG. 7 depicts a flowchart of a third method for constructing a flight path.

FIG. 7 depicts a flowchart 500 of an example of a method for constructing a flight path used in an avionics system. The flowchart begins with module 502 with the receiving of flight plan data containing information related to a flight plan. As embodied herein, such data may be provided by an FMS 138.

The flowchart continues with module 504 with the receiving of object data. Object data may be received from an object data source may include, but is not limited to, a terrain database 132, an obstacle database 134, other aircraft systems 136, or any combination thereof. As embodied herein, object data could include terrain information, obstacle information, or both. A terrain database 132 may be associated with a TAWS. As discussed above, an SVS system could provide a source of object data. In addition to database sources of object data, a non-database terrain and/or obstacle acquisition system could provide a source of object information. Such system may include, but is not limited to, a radar-based TAWS system.

The flowchart continues with module 506 with the extracting of free cells above terrain or other objects corresponding to a flight plan. The extracting of free cells may be accomplished by using a sliding box approach that employs a pre-processing box sliding along the flight path, where the pre-processing box could be centered on the flight path. Once the pre-processing boxes have been defined, a recursive space decomposition technique may be employed within the boundaries of the pre-processing boxes to extract free cells that are inter-connected together. As embodied herein, examples of recursive spatial decomposition techniques include, but are not limited to, Octree and MOctree. At this point in the method, the extracted free cells may be considered as available free cells.

The flowchart continues with module 508 with the receiving of threat data. As embodied herein, a threat data source could be any source that may provide data representative of hazardous flight conditions that could endanger the aircraft such as, but not limited to, hostile military weaponry and meteorological conditions. Threat data may include information identifying the location of the threat, zone of threat, and/or type of threat. Systems which may provide threat data include, but are not limited to, an ADS, a weather radar system, a WAWS, and/or an AAWS.

The flowchart continues with module 510 with the extracting of pseudo-free cells above terrain or other objects corresponding to the threat data. As embodied herein, the extracting of free cells may be accomplished by using a recursive spatial decomposition techniques include, but are not limited to, Octree and MOctree. The extracting of free cells may be accomplished by defining a search box containing each threat; any portion of the search box falling outside of a pre-processing box may be ignored. For each threat zone, the smallest cell $r_i$ which completely encompasses the threat may be identified. Once identified, the terrain and space of $r_i$ may be decomposed, and cell(s) completely free of terrain after the decomposition may be counted or identified as pseudo-free cell(s).

The flowchart continues with module 512 with the identifying of pseudo-free cells as either full cells or free cells. If terrain masking is not applied, pseudo-free cell(s) may be identified as full cell(s). If terrain masking is applied, four (4) line-of-sight ("LOS") vectors between the threat and the four corners of the top surface of each pseudo-free cell may be computed. If the LOS vectors penetrate through terrain, then the pseudo-free cell may be identified as a free cell; otherwise, it may be counted as a full cell.

The flowchart continues with module 514 with the eliminating of full cells from the availability of free cells. After pseudo-free cells have been identified as free cells, these may be reconnected or joined with available free cells. A lack of re-connection may be encountered when a full cell attempts to re-connect with a free cell; such lack of re-connection eliminates the cell from being an available free cell.

The flowchart continues with module 516 with the determining of traversable free space from the available free cells. The availability of free cells could include those free cells extracted in modules 506 less those pseudo-free cells sharing the same location in space that were eliminated in module 514 because they were identified as full cells.

The flowchart continues with module 518 with the determining of a deviation point and re-entry point on the flight plan which may define the beginning and ending points of a reference path. After the threat zone(s) has been identified, the two points on the flight plan may be determined so as to circumvent each threat zone. As embodied herein, a manufacturer or end-user could establish a buffer zone to provide a safe distance before the threat zone is penetrated. As embodied herein, the location of such points could be determined by a manufacturer as either a fixed or variable distance from the edge of such zone(s).

The flowchart continues with module 520 with the construction of a reference path between two points on flight plan, wherein the two points may be the deviation and re-entry points on the flight plan. Given these points, a path planning algorithm such as, but not limited to, the Focused D* real time path re-planning algorithm may be applied to compute the reference path based on the traversable free space The flowchart continues with module 522 with the refining of a reference path to determine a flight path. Such reference path refinement may be accomplished by the method of constructing a flight path by employing a GA as discussed above and shown on flowchart 300.

The flowchart continues with module 524 with the providing of data representative of the flight path to at least one avionics system or component thereof. As embodied herein, such avionics systems could include, but are not limited to, an FMS, a vision system, an autoflight system, and/or a display unit system. In an additional embodiment, a manufacturer or end-user could establish a distance(s) from a threat zone for providing alert(s) before the threat zone is penetrated, where such alert(s) may be provided to a crew alerting system. In an additional embodiment, such data could include flight plan data not affected by the construction and refinement of the reference path. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system of constructing a flight path used by an avionics system, said system comprising:
   a source for providing flight plan data;
   a source for providing object data;
   a processor configured to
      receive data representative of a flight plan of an aircraft,
      receive data representative of objects,
      define a plurality of pre-processing boxes, where
         at least one pre-processing box corresponds to a current position of the aircraft along the flight plan, and
         at least one pre-processing box corresponds to a future position of the aircraft along the flight plan,
      extract free cells that are located vertically above objects corresponding to the flight plan, where
         the free cells are three-dimensional, and the extraction of free cells employs a recursive space decomposition technique within the plurality of pre-processing boxes, define traversable free space based upon availability of free cells, where
the traversable free space is three-dimensional, construct a reference path traversing through the traversable free space between two points on the flight plan, refine the reference path using a genetic algorithm, and provide flight path data to at least one avionics system, wherein
such flight path data is representative of at least the refined reference flight path between the two points on the flight plan; and at least one avionics system configured to receive the flight path data.

2. The system of claim 1, further comprising:
a source for providing threat data, and
the processor is further configured to
receive threat data,
extract pseudo-free cells above objects corresponding to the threat data, where the pseudo-free cells are three-dimensional,
identify each pseudo-free cell as either a free cell or a full cell, where a pseudo-free cell is identified as a full cell when
terrain masking is not applied, or
at least one line of sight vector in the pseudo-free cell does not penetrate through terrain when terrain masking is applied,
eliminate full cells from the availability of free cells, and
determine the location of deviation and re-entry points based upon the threat data, whereby
such deviation and re-entry points are used as the two points on the flight plan.

3. The system of claim 2, wherein the source for providing threat data comprises at least one of the following: an aircraft defense system, a weather radar system, a weather awareness and warning system, and an airspace awareness and warning system.

4. The system of claim 2, further comprising:
a crew alerting system configured to receive a threat alert signal, where
the processor is further configured to
generate the threat alert signal based upon the threat data, and provide the threat alert signal to the crew alerting system.

5. The system of claim 1, wherein the source for providing object data includes a terrain database, an obstacle database, a non-terrain and/or obstacle acquisition system, or a combination thereof.

6. The system of claim 1, wherein the objects includes terrain, obstacles, or both.

7. The system of claim 1, wherein the processor is a processor of an avionics system.

8. The system of claim 7, wherein the processor is a processor of a flight management system, a vision system, an autoflight system, or a display unit system.

9. The system of claim 1, wherein the genetic algorithm comprises:
generating a plurality of path candidates from the reference path to form a population;
evaluating a fitness value for each path candidate;
performing a generation cycle, wherein the generation cycle comprises
selecting parent path candidates from best path candidates,
generating a plurality of offspring path candidates from parent path candidates,
evaluating a fitness value for each offspring path candidate,
adding the offspring path candidates to the population, and
selecting best path candidates to form a population;
repeating the generation cycle on the formed population when an exit condition has not been reached; and
generating flight path data from the data representative of the best path candidate from the formed population when an exit condition has been reached.

10. The system of claim 9, wherein
the plurality of path candidates and a plurality of offspring path candidates are generated using a plurality of genetic operators, and
the fitness value of each path candidates and the fitness value of each offspring path candidate are evaluated using at least one aircraft kinematic constraint.

11. The system of claim 10, wherein an aircraft kinematic constraint comprises at least one aircraft performance constraint, at least one flight operational constraint, or at least one aircraft performance constraint and at least one flight operational constraint.

12. The system of claim 10, further comprising:
a source for providing input factor data, and
the processor is further configured to receive input factor data, whereby
such input factor data is applied to at least one aircraft kinematic constraint.

13. The system of claim 1, wherein the avionics system receiving the flight path data includes at least one of the following: a flight management system, a vision system, an autoflight system, or a display unit system.

14. The system of claim 1, wherein the flight path data includes flight plan data not affected by the construction and refinement of the reference path.

15. A module for constructing a flight path used by an avionics system, said module comprising:
an input communications interface to facilitate the receiving of data by a processor from at least one data source;
a processor configured to
receive data representative of a flight plan of an aircraft,
receive data representative of objects,
define a plurality of pre-processing boxes, where
at least one pre-processing box corresponds to a current position of the aircraft along the flight plan, and
at least one pre-processing box corresponds to a future position of the aircraft along the flight plan,
extract free cells that are located vertically above objects corresponding to the flight plan, where
the free cells are three-dimensional, and
the extraction of free cells employs a recursive space decomposition technique within the plurality of pre-processing boxes,
define traversable free space based upon availability of free cells, where
the traversable free space is three-dimensional,
construct a reference path traversing through the traversable free space between two points on the flight plan,
refine the reference path using a genetic algorithm, and
provide flight path data to at least one avionics system, wherein
such flight path data is representative of at least the refined reference flight path between the two points on the flight plan; and an output communications interface to facilitate the providing of the flight plan data to at least one avionics system.

16. The module of claim 15, wherein
the processor is further configured to
receive threat data;
extract pseudo-free cells above objects corresponding to the threat data, where the pseudo-free cells are three-dimensional;
identify each pseudo-free cell as either a free cell or a full cell, where a pseudo-free cell is identified as a full cell when
terrain masking is not applied, or
at least one line of sight vector in the pseudo-free cell does not penetrate through terrain when terrain masking is applied;
eliminate full cells from the availability of free cells; and
determine the location of deviation and re-entry points based upon the threat data, whereby
such deviation and re-entry points are used as the two points on the flight plan.

17. The module of claim 16, wherein
the processor is further configured to
generate a threat alert signal based upon the threat data, and
provide the threat alert signal to the crew alerting system.

18. The module of claim 15, wherein the objects includes terrain, obstacles, or both.

19. The module of claim 15, wherein the module is a module of an avionics system.

20. The module of claim 19, wherein the module is a module of a flight management system, a vision system, an autoflight system, or a display unit system.

21. The module of claim 15, wherein the genetic algorithm comprises:
generating a plurality of path candidates from the reference path to form a population evaluating a fitness value for each path candidate;
performing a generation cycle, wherein the generation cycle comprises
selecting parent path candidates from best path candidates,
generating a plurality of offspring path candidates from parent path candidates,
evaluating a fitness value for each offspring path candidate,
adding the offspring path candidates to the population, and
selecting best path candidates to form a population;
repeating the generation cycle on the formed population when an exit condition has not been reached; and
generating flight path data from the data representative of the best path candidate from the formed population when an exit condition has been reached.

22. The module of claim 21, wherein
the plurality of path candidates and a plurality of offspring path candidates are generated using a plurality of genetic operators, and
the fitness value of each path candidates and the fitness value of each offspring path candidate are evaluated using at least one aircraft kinematic constraint.

23. The module of claim 22, wherein an aircraft kinematic constraint comprises at least one aircraft performance constraint, at least one flight operational constraint, or at least one aircraft performance constraint and at least one flight operational constraint.

24. The module of claim 22, wherein the processor is further configured to receive input factor data, whereby such input factor data is applied to at least one aircraft kinematic constraint.

25. The module of claim 15, wherein the flight path data includes flight plan data not affected by the construction and refinement of the reference path.

26. A method of constructing a flight path used by an avionics system, said method comprising:
receiving data representative of a flight plan of an aircraft;
receiving data representative of objects;
defining a plurality of pre-processing boxes, where
at least one pre-processing box corresponds to a current position of the aircraft along the flight plan, and
at least one pre-processing box corresponds to a future position of the aircraft along the flight plan;
extracting free cells that are located vertically above objects corresponding to the flight plan, where
the free cells are three-dimensional, and
the extraction of free cells employs a recursive space decomposition technique within the plurality of pre-processing boxes;
defining traversable free space based upon availability of free cells;
constructing a reference path traversing through the traversable free space between two points on the flight plan;
refining the reference path using a genetic algorithm; and
providing flight path data to at least one avionics system, wherein
such flight path data is representative of at least the refined reference flight path between the two points on the flight plan.

27. The method of claim 26, further comprising:
receiving threat data;
extracting pseudo-free cells above objects corresponding to the threat data, where
the pseudo-free cells are three-dimensional;
identifying each pseudo-free cell as either a free cell or a full cell, where a pseudo-free cell is identified as a full cell when
terrain masking is not applied, or
at least one line of sight vector in the pseudo-free cell does not penetrate through terrain when terrain masking is applied;
eliminating full cells from the availability of free cells; and
determining the location of deviation and re-entry points based upon the threat data, whereby
such deviation and re-entry points are used as the two points on the flight plan.

28. The method of claim 27, further comprising:
generating a threat alert signal based upon the threat data, and
providing the threat alert signal to a crew alerting system.

29. The method of claim 26, wherein the genetic algorithm comprises:
generating a plurality of path candidates from the reference path to form a population;
evaluating a fitness value for each path candidate;
performing a generation cycle, wherein the generation cycle comprises
selecting parent path candidates from best path candidates,
generating a plurality of offspring path candidates from parent path candidates,
evaluating a fitness value for each offspring path candidate, adding the offspring path candidates to the population, and selecting best path candidates to form a population;

repeating the generation cycle on the formed population when an exit condition has not been reached; and generating flight path data from the data representative of the best path candidate from the formed population when an exit condition has been reached.

30. The method of claim 29, wherein the plurality of path candidates and a plurality of offspring path candidates are generated using a plurality of genetic operators, and the fitness value of each path candidates and the fitness value of each offspring path candidate are evaluated using at least one aircraft kinematic constraint.

31. The method of claim 30, wherein an aircraft kinematic constraint comprises at least one aircraft performance constraint, at least one flight operational constraint, or at least one aircraft performance constraint and at least one flight operational constraint.

32. The method of claim 30, further comprising:

receiving input factor data, whereby such input factor data is applied to at least one aircraft kinematic constraint.

33. The method of claim 26, wherein the flight path data includes flight plan data not affected by the construction and refinement of the reference path.

* * * * *